Jan. 5, 1932.　　　W. E. CORBIN　　　1,839,374
TRUE SAMPLING MECHANISM FOR COTTON CONDENSERS
Filed Aug. 2, 1928　　　3 Sheets-Sheet 1
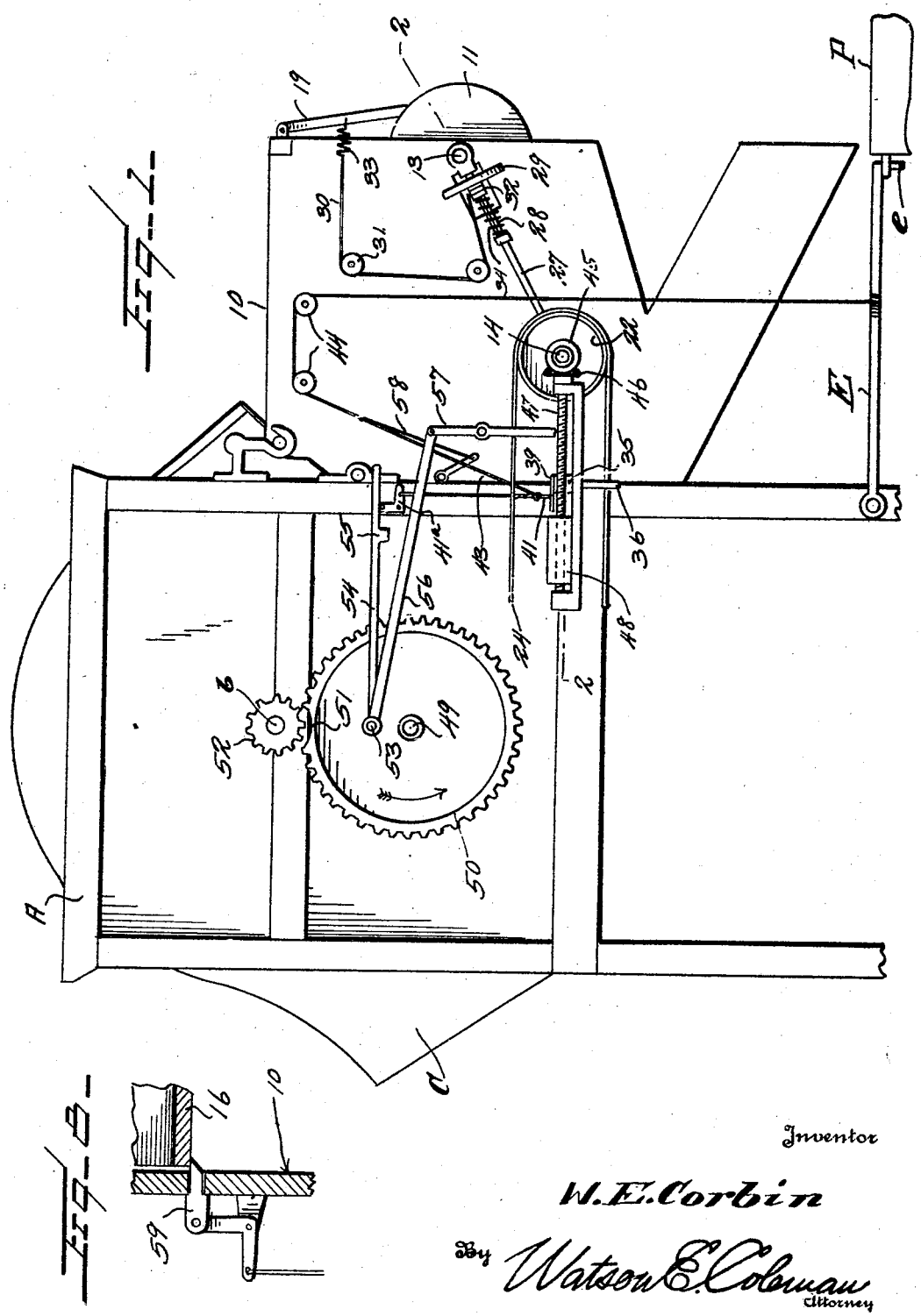
Inventor
W. E. Corbin
By Watson E. Coleman
Attorney Jan. 5, 1932.    W. E. CORBIN    1,839,374
TRUE SAMPLING MECHANISM FOR COTTON CONDENSERS
Filed Aug. 2, 1928    3 Sheets-Sheet 2
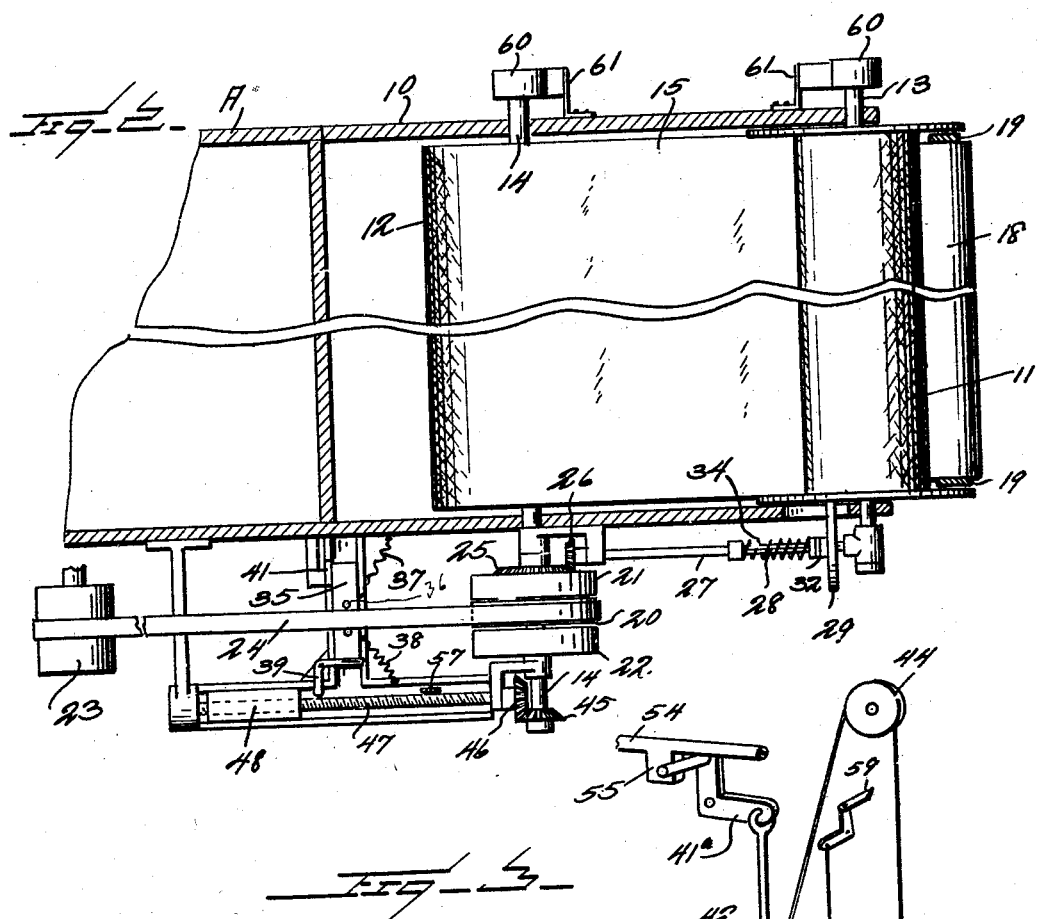
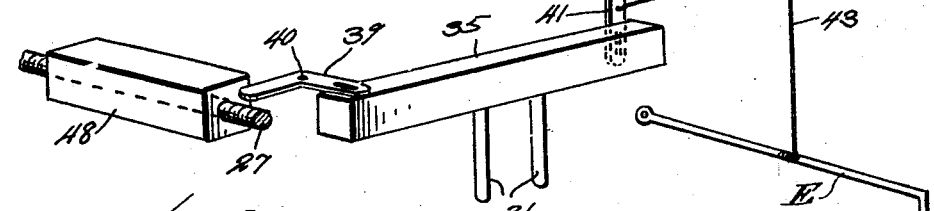
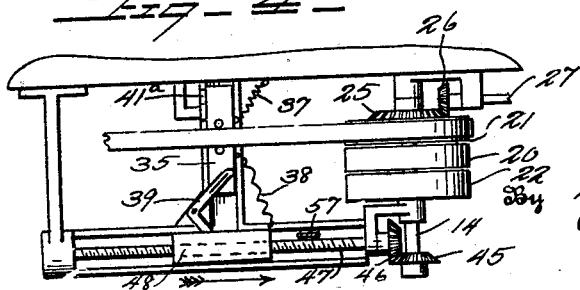
Inventor
W. E. Corbin
By Watson E. Coleman
Attorney

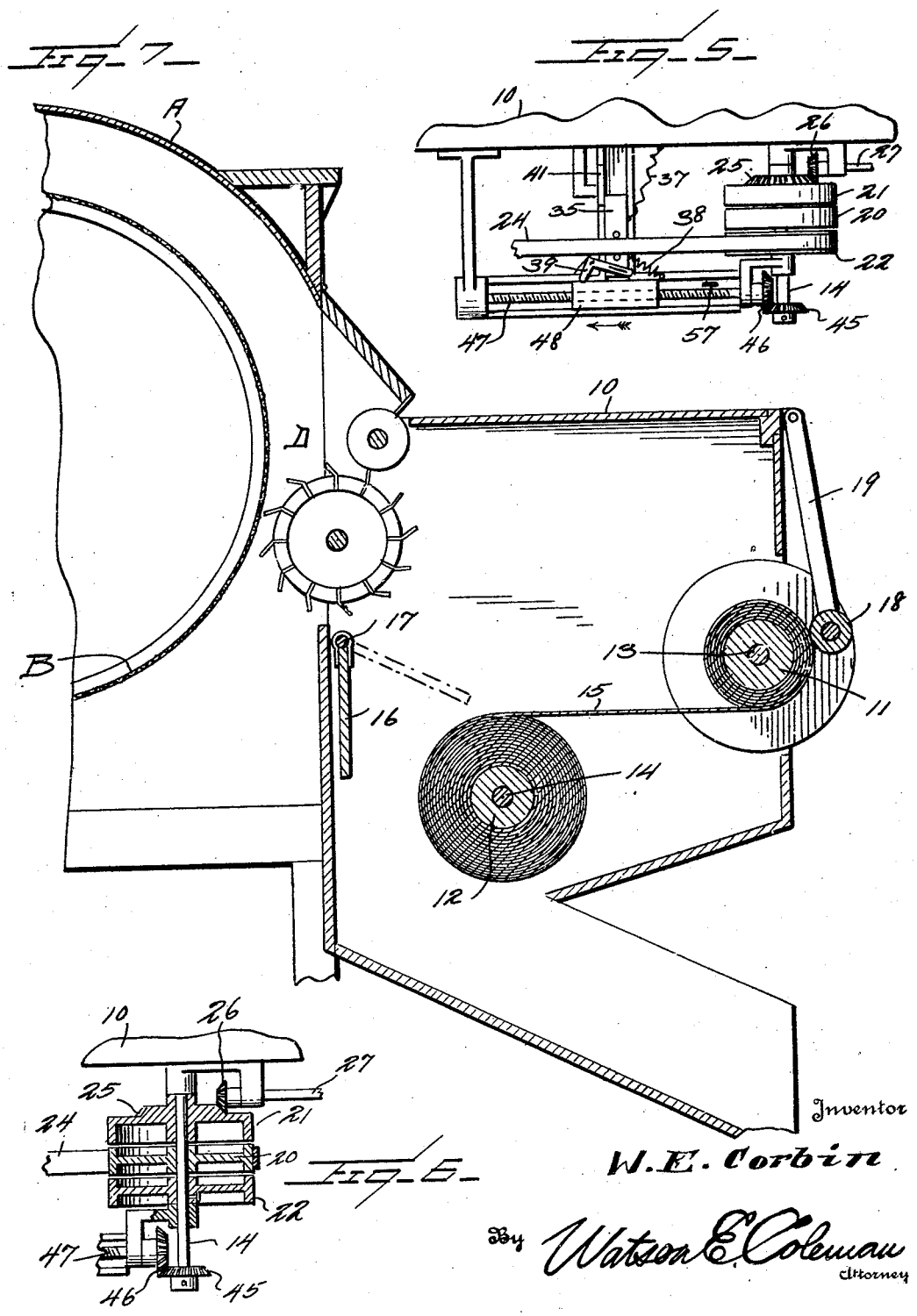

Patented Jan. 5, 1932

1,839,374

UNITED STATES PATENT OFFICE

WILLIAM ERNEST CORBIN, OF SENTINEL, OKLAHOMA

TRUE SAMPLING MECHANISM FOR COTTON CONDENSERS

Application filed August 2, 1928. Serial No. 296,988.

This invention relates to the art of condensing cotton and more particularly to means associated with a square bale condenser whereby cotton, which has been left within the gin from a previous ginning operation will be automatically held out at the commencement of a second ginning operation, and then, after a certain amount of cotton has passed from the condenser into the baling press automatically allowed to pass into the press box so that the cotton, which would of course not be a true sample of the bale being made in the second operation may be disposed within the interior of the bale and the interior of the cotton initially passing from the condenser into the baling press.

Cotton is of many different grades, there being some ten grades in actual practice, certain of these grades for instance being "middling fair", "good middling", "short middling", "middling", "strict low", etc. "Middling" is the standard grade, at any rate in certain sections of the country, and cotton above the middling grade brings a certain premium, while on cotton that is of a lower grade than middling there is a reduction.

Furthermore, cotton varies with regard to the staple; the long staple cotton having a length of one and one-half inches, the standard staple having a length of fifteen-sixteenths of an inch, and the lower grades being shorter than these lengths.

Furthermore, cotton may be either "snapped" or picked cotton. The "snapped" cotton is that which is picked in the boll and is obviously of a much lower grade than picked cotton which is practically clean inasmuch as the cotton fiber is pulled out of the boll.

The picked cotton brings a considerably higher price than the "snapped" cotton.

When cotton is ginned and condensed, there is always a certain amount of cotton remaining in the gin rolls from one ginning operation, the cotton so left over being ordinarily about twenty-five pounds. When the cotton for the next bale is being ginned and condensed this remainder cotton left over from the last ginning operation is the first cotton to be discharged from the condenser into the press box and is disposed at the lower end, therefore, of the new bale. The cotton for the first bale may be of an inferior grade while the cotton for the next succeeding bale may be of a much higher grade, yet the remainder cotton from the first ginning operation will pass in to the press box first for the second ginning operation, and as a consequence the second bale will have a "plate" of inferior cotton at one side. Inasmuch as the bale is always graded by taking samples from the sides and is always graded by the poorest sample, it follows that the whole five-hundred pound bale will be graded lower than it should be, thus making a considerable difference in the selling value of the bale.

This works a hardship on the farmer who sells the cotton to the ginner, on the ginner who perhaps pays a relatively higher price for two bales of "middling" cotton to one farmer and has to sell one of these bales at a lower price, and works a hardship on the buyer who believes he is buying a certain grade of cotton, or cotton having a certain length of staple to be used for a certain purpose and finds, after the cotton has gone to the mill that the greater portion of the bale is made up of cotton having a different staple, and though perhaps more valuable, is not suited for that particular purpose.

It has been the practice under some circumstances after the bale has been ginned for the ginner to swing the press boxes around a quarter turn and then allow the cotton remaining in the gin to be discharged onto the floor. Then the press boxes are swung to their full position and the new cotton is ginned for a sufficient length of time and then the cotton which is on the floor is placed in the gin and passes directly to the press boxes. While thus the difficulty heretofore referred to is overcome, yet this requires that the cotton shall be discharged upon the floor where it becomes soiled and filled with dust and thus rendered of inferior quality, and furthermore requires that the ginning and condensing operation be interrupted while the cotton is discharged onto the floor and again when the cotton on the floor is passed into the gin.

In an application filed by me on the 4th day of May, 1928, Serial No. 275,031, I disclosed a condenser having a swinging door so that the cotton discharged from the gin at the beginning of forming a bale may be discharged into a compartment or chamber and retained in this compartment until a portion of the new cotton has been placed in the press box, and then the door is swung to a position permitting this retained and initially discharged cotton to be discharged into the press box. This action, however, is not automatic and the general object of the present invention is to provide means which will automatically, at the beginning of a baling operation retain that portion of the cotton initially discharged from the gin and then after a certain amount of the new cotton has been carried to the press box, discharge the retained cotton into the press box.

Cotton which is initially discharged from the gin and which is retained will be retained in the form of a "plate" and will be discharged into the press box in the form of a "plate."

A further object in this connection is to provide two rolls or drums and a flexible belt adapted to be wound upon these drums and provide a gate adapted to discharge the cotton either onto this belt or to the press box, this gate being automatically swung to the first named position at the beginning of the baling operation, so that the cotton discharged upon the belt will be wrapped with the belt around one of the rollers, and provide means whereby, after a certain quantity of the new cotton has been condensed and discharged into the press box, the other roll shall be turned in a reverse direction and the door opened so that the cotton so wrapped around the first roll will be discharged from the belt into the press box in the form of a "plate", this cotton thus being disposed automatically within the interior of the bale.

A further object is to provide means whereby the door may be automatically swung to its closed position to deflect the cotton onto the belt when the ginner releases the pivoted hook, now present on condensers and balers which normally holds the swinging press box from oscillation or turning so that, as soon as this hook is released it will cause the closure of the door and the actuation of the first named roll or drum, and a further object in this connection is to provide means for automatically stopping the rotation of the first named roll and the winding up of the belt after a predetermined time, holding the cotton thus wrapped for a predetermined time and then reversing the motion of the belt and automatically opening the door to permit the cotton wound upon the belt to be discharged into the press box.

Other objects will appear in the course of the following description.

My invention is illustrated in the accompanying drawings, wherein—

Figure 1 is a side elevation of a cotton condenser and part of a press box showing my invention applied thereto.

Fig. 2 is a horizontal section through the condenser on the line 2—2 of Fig. 1;

Figure 3 is a perspective diagrammatic view showing the belt shifter bar and means for shifting it;

Figure 4 is a fragmentary top plan view of the belt shifter bar with the belt shifted onto the pulley 21;

Figure 5 is a like view to Fig. 4 but showing the belt shifted onto the pulley 22;

Figure 6 is a fragmentary enlarged sectional view through the driving pulleys;

Figure 7 is an enlarged fragmentary vertical sectional view through the condenser, showing the cotton retaining elements; and Figure 8 is a fragmentary sectional view through the wall of the condenser and through the door showing the latch.

Referring to the drawings, A designates a casing of a condenser of any suitable or usual construction having therein the usual perforated drum B, operating upon the shaft $b$. The cotton is admitted through the flue C into the interior of the condenser casing as usual and is withdrawn from the drum by the doffer D.

Disposed in advance of the condenser is a casing 10 and disposed in this casing is the winding drum or roll 11 and a winding drum or roll 12. The drum 11 is mounted upon the shaft 13 and the drum 12 is mounted upon the shaft 14. The drum 11 is larger than the drum 12, and attached at its ends to both of these drums and adapted to be wound up thereon is a belt or other flexible element 15. Hinged below the lowermost doffer roll $b$ is a door 16 hinged at 17 and adapted to swing from a position where it will deflect the cotton passing from the doffer rolls onto the belt 15 or to a position where it is depending or hanging straight downward. When in the last named position, the cotton issuing from between the doffer rolls will be discharged directly into the press box, but in the first named position the cotton will be discharged onto the belt 15.

Coacting with the drum or roll 11 is a follower roll 18 which is supported for swinging movement by links 19, in turn supported in any suitable manner so that this follower will swing inward and constantly bear against the periphery of the roll or drum 11.

The shaft 14 which carries the relatively small roll 12 carries upon it three pulleys or band wheels 20, 21, and 22. The pulley 20 is an idler pulley running loosely upon the shaft 14, the pulley 21 is also loose upon the shaft 14, and the pulley 22 is fixed upon the shaft 14.

For the purpose of driving these pulleys I have provided a band wheel or pulley 23 driven from any source of power and a driving belt 24, which is disposed on the pulley 23 and shiftable by belt shifting mechanism to be described from the pulley 20 to either the pulley 21 or the pulley 22. The pulley 21 carries upon its hub or otherwise connected to it the bevel gear wheel 25 which in turn meshes with the bevel gear wheel 26 which is mounted upon a shaft 27 extending parallel to the end of the drum or winding roll 11. This shaft 27 opposite the winding drum is square or many sided as at 28, and carries upon it the friction wheel 29 which bears against the end of the drum 11. This friction wheel is longitudinally shiftable upon the shaft 27 as if splined thereon and thus by shifting this friction wheel the speed of rotation of the winding drum 11 may be varied. This friction wheel is shifted by the follower roller 18 in the following manner.

Connected to the shaft of this roller is a cable 30 or other flexible element, which extends over a pulley 31 and then extends rearward and is connected to the hub of the friction wheel 29. I have illustrated this hub as being formed with a circumferential recess wherein is disposed an annulus 32 to which the extremity of the cable is connected. Preferably, in order to cushion the slight oscillations which would be otherwise given to the cable 30, by slight oscillations of the follower 18, I dispose a spring 33 in the length of the cable 30. A spring 34 surrounds the shaft 27 and bears against the hub of the friction wheel and urges the friction wheel toward the center of rotation of the winding drum 11. As the follower 18 is forced outward, however, by the winding up thereon of the belt 15, the strain exerted upon the cable 30 will cause the friction wheel to move more and more toward the periphery of the winding drum 11 and thus, as the diameter of the winding drum gets larger and larger, due to the winding up thereon of more and more cotton and belt, the speed of this winding drum will be reduced. This is necessary, of course, in order to prevent the winding speed of the drum from increasing as the belt and cotton are wound thereon.

For the purpose of shifting the belt 24 from the neutral loose pulley 20 to the pulleys 21 or 22, I provide the belt shifter bar 35 having the outwardly projecting lugs 36 which are adapted to engage on each side of the belt 24 and thus the bar 35 is shifted from one side to the other to shift the belt from one side to the other.

Springs 37 and 38 are disposed on each side of the belt shifting lugs, these springs being contractile and acting against each other to hold the belt shifting bar in a middle position. Connected to one end of the belt shifting bar is a bell crank lever 39 supported upon a pivot 40, and connected to the other end of the shifter bar is a bell crank lever 41. This bell crank lever may be pivoted at 42 on any suitable support. If the free arm of this bell crank lever be pulled in one direction it will shift the bar 35 to the right in Fig. 3 and if pushed in the other direction it will shift the bar 35 to the left, and this of course will correspondingly shift the bell crank lever 39 from what may be termed its neutral position, either right or left.

It is necessary in the operation of this mechanism as will be apparent that the belt 24 shall be first shifted from the loose pulley 20 to the loose pulley 21 in order to initially drive the winding drum 11 and to this end I connect to the bell crank lever 41 a cable or like element 43. This cable 43 may pass over one or more pulleys 44 and be connected to the usual swinging latch hook shank E which is as usual swingingly mounted upon the lower portion of the condenser and is formed at its free end with a hook e adapted to be engaged with the press box P to hold the press box in alinement with the discharge from the condenser during the period when the press box is being filled and while the bale in the companion press boxes is being tied. This hook is relatively weighty and when it is released by the pressman from engagement with the press-box it will drop down and cause the bell crank lever 41 to shift the bar 35 toward the right in Fig. 3 to carry the belt 24 from the loose pulley 20 onto the loose pulley 21. This release of the hook E is performed at the time when a ginning operation has been completed, so as to permit the press boxes to be swung to bring an empty press box beneath the condenser. Thus it will be seen that the action of releasing the hook E immediately starts the operation of the winding drum 11 so that the new cotton and the old which is being discharged from the condenser is immediately discharged onto the belt 15 and is immediately carried around drum 11, this occurring while the rolls are being cleaned of the old cotton. As soon as the press boxes have been swung around to bring the empty box beneath the condenser, the hook E is replaced in its locking position and in order to prevent a return of the shifter bar 35 to its neutral position under the action of the spring 38 the following mechanism is provided.

Mounted upon the shaft 14 at the outer end thereof is the bevel gear wheel 45 which meshes with a bevel gear wheel 46 mounted upon a worm or screw 47. Mounted upon the screw is a slide or traveller 48 with which the screw has threaded engagement, and thus as the screw rotates in one direction or the other, the slide will be shifted in one direction or the other. Initially, this slide 48 is disposed in the position shown in Fig. 2, outward beyond the bell crank lever 39. When the shipper bar 35 is moved to the left in Fig. 4, the belt 24 drives the loose pulley 21, and this through the mechanism heretofore described, causes a rotation of the winding drum 11. This winds up the belt 15 and causes a rotation of the drum 12 and the shaft 14, the motion of which shaft is transmitted to the screw 47. This causes a movement of the slide 48 toward the gear wheel 46 and immediately that the shipper bar 35 has been shifted to the left in Fig. 4, the slide 46 will bear against the outwardly projecting arm of the bell crank lever 39 and will act as a stop, preventing any return of the shipper bar 35 to its neutral position under the action of the spring 38. So long as the slide 48 is bearing against this bell crank lever, just so long will the bar 35 be held to the left in Fig. 4, but when the slide 48 has passed beyond the bell crank lever 39, the bell crank lever will be released and the spring 38 will shift the bar to the right in Fig. 4 and bring the belt 24 again to a neutral position on the loose pulley 20, thus the action of the roller or winding drum 11 will be stopped with all of old cotton from the first ginning operation and, of course some of the new cotton too, wound up on the belt 15 of the drum 11.

It is now necessary to unwind the belt 15 from the roller 11 to discharge this cotton into the press box and also necessary to shift the door 16 from the position shown in dotted lines Fig. 7 to its open position. The mechanism whereby the door is shifted will be later described, but the mechanism for connecting the roller 12 with the driving mechanism will be now described.

Mounted upon a shaft 49 is a mutilated gear wheel 50 having its teeth omitted at the point 51. The shaft $b$ of the perforated drum B carries upon it a pinion 52. The gear wheel 50 is provided with a wrist pin 53 and extending from this wrist pin is a rod 54 which carries upon it a lug 55 which is adapted to bear against a bell crank lever 41$^a$, this lug being adapted when urged against the bell crank lever, to shift the bar 35 to the left in Fig. 3. This gear wheel 50 is initially shown in Fig. 1 with the pinion 52 disposed in the mutilation of this gear wheel. For the purpose of initially shifting the gear wheel 50 in the direction of the arrow Fig. 1, to bring it into engagement with the pinion 52, I provide a rod 56 which is connected to a lever 57 having one end disposed in the path of movement of the slide 48. When therefore this slide arrives at its innermost position on the screw 47 it will strike the lever 57 and through the rod 56 shift the gear wheel 50 a slight distance in a counter-clockwise direction to cause the engagement between the gear wheel 50 and the pinion 52. Immediately the pinion 52 meshes with the teeth of the wheel 50, the wheel 50 commences to revolve and this acts to retract the rod 54 until the wheel 50 has made approximately one-half revolution when the rod 54 will again be advanced and eventually the lug 55 will bear against the extremity of the bell crank lever 41$^a$ and will shift the bar 35 toward the left in Fig. 3, against the action of the spring 37 shifting the belt 24 onto the pulley 22. This will positively rotate the shaft 14 and give a positive rotation to the winding drum 12 so that the winding drum will be rotated in a counter-clockwise direction, winding up the belt 15 upon the winding drum 12. At the same time the door 16 is opened and the cotton upon the belt 15 will be discharged into the press box past the open door 16. Immediately that the shaft 14 is positively rotated, the screw 47 will rotate in a reverse direction and cause the slide 48 to move outward on the screw to bear against the extremity of the bell crank lever 39 (see Fig. 5) and thus hold the shipper bar 35 in the position to which it has been shifted by the lug 55 until the slide 48 has passed the bell crank lever 39. Immediately that the slide passes the bell crank lever 39, the spring 37 retracts the shipper bar 35 and the belt 24 to the neutral position, and the rollers 11 and 12 cease to function during the remainder of the filling of the press box.

The door 16 swings of course in an arc and this door at its hinged end as an arm (see Figure 1) which has connected to it a cable 58 which is also connected to the latching hook E. When therefore this latch hook is detached from its engagement with the press box to permit the filled press box to be turned, and the empty press box to be brought beneath the condenser, the dropping of the hook causes the lifting of the door to its closed or deflecting position.

The door is held in this position by a spring latch 59 which is connected by a cable or wire to the bell crank lever 41 so that when this lever is shifted in a clockwise direction by the shifting of the shifter bar 35 to the left in Fig. 3, the latch will be retracted and the door will fall.

Means are provided upon the drums or rollers 11 and 12 for preventing back lash of these rollers and preventing the belt 15 from becoming slack. I have illustrated for this purpose friction wheels 60 mounted upon the shafts of the two drums and springs 61 bearing against these friction wheels. Any means may be used for this purpose.

It will thus be seen that the entire operation is automatic, that the cotton remaining within the gin after one bale has been formed will be automatically retained from passing into the press box until a certain amount of the new cotton has been discharged into the press box and that then and only then, will the remainder of the cotton be discharged into the press box and that as soon as this discharge has been completed, my mechanism will be held from any further movement until it is again started into action by the pressman detaching the hook E in order to bring the empty press box into position for forming a new bale.

It will be seen that with this mechanism, immediately that the hook connecting the press box to the condenser is released to permit the full press box to be turned out from beneath the condenser and bring the empty press box into place, that the condenser commences to discharge the cotton that was retained within the gin from a previous operation onto the belt 15 along with new cotton and that the cotton thus discharged is automatically detained or retained and prevented from passing down to the press box during a predetermined interval while the belt 15 is winding up upon the drum 11. Thus for a predetermined time no cotton is passing into the press box. By the time the empty press box has been returned to a position beneath the condenser and when all but approximately ten feet or so of the belt has been wound upon the drum 11, the latch hook E is raised and the door 16 drops to its lower position. The cotton is then discharged directly from the condenser into the press box, this occurring while the gear wheel 50 is moving through a one-half revolution. After this certain amount of cotton issuing directly from the condenser is discharged into the press box, then the drum 12 is actuated to unwind the belt 15 from the drum 11 and the cotton carried upon the belt will be discharged over the drum 12 into the press box along with the cotton which is being discharged directly from the press box. Thus this cotton which has been retained and the greater part of which is formed by cotton left in the gin from a previous baling operation, will be discharged in the middle portion of the bale which is being made.

It will be understood that the placing of this cotton retained from a former baling operation in the middle or central portion of the new bale being made with fresh cotton, is not in any sense deceptive. In the first place the cotton so retained may be of a higher quality than that which forms the bulk of the bale, and in the second place even though it be of a poorer quality than that of the bale is forms but a very small percentage of the total bale.

Such a percentage would pass into the bale under any circumstances, but if it were disposed on the outside of the bale where it would be taken as a sample, it would degrade all the remainder of the bale, even though the bulk of the bale was of superior cotton, for the reason heretofore stated, and on the other hand if it were superior to the bulk of the bale it would not affect the grading of the bale, because the grading of the bale would be made to accord with the quality of the poorest cotton removed therefrom. By placing this cotton, which has been retained within the gin from a prior baling operation, within the interior of the bale where it cannot become the subject of sampling, the buyer of the cotton is not defrauded, but on the contrary he knows that the bulk of that bale is in accordance with the samples which have been pulled from opposite sides of the bale, and therefore, knows precisely what he is getting as regards all but about twenty-five pounds of the bale which may be of poorer quality, but also might be of better quality.

What I claim is—

1. The combination with a condenser of a cotton gin, a rotatable press box and manually controlled means detachably holding the box to receive cotton from the condenser, of means operated automatically upon a detachment of said holding means acting to withhold a predetermined amount of cotton discharged from the condenser from passing to the press box, then acting automatically to permit the cotton discharged directly from the condenser to pass directly to the press box and then acting, after a predetermined time, to cause the discharge of the retained cotton to the press box along with the cotton discharged from the condenser.

2. The combination with a condenser of a cotton gin, and a press box into which it discharges, of manually controlled means to prevent cotton discharged from the condenser passing into the press box for a predetermined time, said means then acting to permit the discharge of cotton issuing directly from the condenser into the press box for a predetermined time, then acting to discharge all of the previously detained cotton into the press box, together with the cotton issuing directly from the condenser and then acting to permit the discharge of cotton from the condenser into the press box until the press box has been filled.

3. The combination with a condenser of a cotton gin having a discharge opening, a press box swingable into or out of receiving position, and manually controlled means for detachably holding the box in position to receive cotton from the condenser, of means operated automatically upon a detachment of said holding means, acting to prevent cotton issuing from the condenser from passing to the press box for a predetermined time, then acting automatically for a predetermined time to prevent the passage of the retained cotton to the press box but permit the passage of cotton issuing directly from the condenser, said means then acting automatically to discharge both the retained cotton and the cotton issuing from the condenser to the press box.

4. The combination with a condenser and a coacting press box, of a door controlling passage between the condenser and the press box and acting when closed to deflect the cotton issuing from the condenser to a cotton retaining element, a manually controlled element operatively connected to said door and when moved in one direction causing the closing of the door, means automatically holding said door closed for a predetermined time, means then acting automatically to release the door to permit the discharge of cotton directly from the condenser into the press box, and means then acting automatically after a predetermined time causing the initially retained cotton to be discharged to the press box with the cotton issuing directly from the condenser.

5. The combination with a condenser and a press box coacting therewith, of a door controlling passage of cotton from the condenser to the press box, a cotton retaining element associated with the condenser, the door when closed deflecting the cotton to said retaining element, manually operable means for causing the closing of the door and automatically actuated means acting after a predetermined time to open said door to permit the discharge of cotton directly from the condenser to the press box, said means then acting automatically after a predetermined time to cause the discharge of the retained cotton into the press box.

6. The combination with a condenser and a press box, of means for retaining a certain amount of cotton initially issuing from the condenser and preventing the cotton passing to the press box, including two winding drums, a belt connected to both drums and adapted to be wound thereon, means for deflecting all of the cotton from the condenser onto said belt, said means being actuated when the condenser is started and simultaneously rotating one of said drums to thereby wind the belt and cotton upon the drum, means operating automatically after a predetermined time to shift said cotton deflecting means from its deflecting position to permit the discharge of cotton directly from the condenser into said press box, and means then operating automatically after a predetermined time to actuate the other drum and wind the belt off from the first named drum onto the second named drum to thereby discharge the cotton thereon into the press box together with the cotton issuing directly from the condenser.

7. The combination with a condenser and a press box, of means for retaining a certain amount of cotton initially issuing from the condenser and preventing its passing through the press box including two winding drums and a belt therefor adapted to be wound thereon, a door between the condenser and press box, and in a closed position deflecting the cotton from the condenser onto said belt, a driving shaft, manually operable means movable in one direction to shift the door from an open to a closed position, said means simultaneously operatively connecting one of the winding drums to the power shaft, means automatically actuated after a predetermined number of revolutions of the last named winding drum acting to release said door to permit it to shift to an open position, and disconnect the last named winding drum from the power shaft, means acting automatically after a predetermined lapse of time to operatively connect the other winding drum to the power shaft to cause the unwinding of the belt from the first named drum and the discharge of the cotton thereon through said door opening with the cotton issuing directly from the condenser, and means acting automatically after a predetermined number of revolutions of the last named drum to disconnect the last named drum from the power shaft.

8. The combination with a condenser and a press box, of means for retaining a certain amount of cotton initially issuing from the condenser comprising a cotton retaining drum and a cotton discharging drum, and a belt attached to and adapted to be wound upon both of said drums, a door controlling communication from the condenser to the press box and which when closed deflects the cotton issuing from the condenser onto said belt and which when open permits the cotton to be discharged into the press box, means for driving the drums including a shaft having thereon the cotton discharging drum, a neutral loose pulley on the shaft, a second loose pulley on the shaft operatively engaged with the cotton retaining drum and a pulley fast on said shaft, a driving belt normally engaging the neutral pulley, a belt shifter resiliently urged to a neutral position, manually operable means for moving the shifter to shift the belt from the neutral pulley onto the second named loose pulley, means acting automatically to hold the shifter in this position for a predetermined time and then releasing the belt shifter and simultaneously opening the door, means then acting after a predetermined interval to automatically shift the belt shifter in a direction to carry the belt onto the fast pulley and thereby rotate the discharge winding drum to wind up the belt thereon and discharge the cotton thereon through said open door, and holding means acting to hold the belt shifter in the last named position until the cotton has been discharged from the belt and then releasing the belt shifter to permit it and the driving belt to return to neutral position.

9. The combination with a condenser and a press box, of means for retaining a certain amount of cotton initially issuing from the condenser comprising a cotton retaining and a cotton discharging drum, and a belt adapted to be wound thereon, means for deflecting the cotton from the condenser onto the belt, means simultaneously winding the belt upon the retaining drum, means for driving said drums including a shaft having thereon the cotton discharging drum, a neutral loose pulley, a second loose pulley, and a fast pulley, the second named loose pulley carrying a gear wheel, a shaft driven by the last named shaft and extending at right angles to the rotative axis of the retaining drum, a friction wheel thereon engaging the retaining drum, the friction wheel being shiftable along the shaft, means for causing the friction wheel to shift toward the periphery of the drum as the belt is wound up thereon, a driving belt normally engaging the neutral pulley, a belt shifter urged to a neutral position, manually operable means for moving the shifter to carry the belt onto the second named pulley, means acting to hold the belt shifter in this position for a predetermined time, including a slide and a screw driven from said shaft, said slide, after a predetermined movement in one direction releasing the belt shifter, the slide when it reaches said releasing position also releasing the deflecting means to thereby permit the cotton to pass directly from the condenser to the press box, means then acting after a predetermined time to automatically shift the belt shifter in a direction to carry the belt onto the fast pulley, and thereby rotate the cotton discharge winding drum and winding the belt thereon, to thus discharge the cotton from the belt, the screw then acting to reverse the movement of said slide, and the slide holding the belt shifter in its last named shifted position until the slide has passed the shifter, the shifter being then released to return the belt to its neutral position.

10. The combination with a condenser and a press box, of means for retaining a certain amount of cotton initially issuing from the condenser comprising a cotton retaining and a cotton discharging drum, and a belt adapted to be wound thereon, means for deflecting the cotton from the condenser onto the belt, means simultaneously winding the belt upon the retaining drum, means for driving said drums including a shaft having thereon the cotton discharging drum, a neutral loose pulley, a second loose pulley, and a fast pulley, the second named loose pulley carrying a gear wheel, a shaft driven by the last named shaft and extending at right angles to the rotative axis of the retaining drum, a friction wheel thereon engaging the retaining drum, the friction wheel being shiftable along the shaft, means for causing the friction wheel to shift toward the periphery of the drum as the belt is wound up thereon, a driving belt normally engaging the neutral pulley, a belt shifter urged to a neutral position, manually operable means for moving the shifter to carry the belt onto the second named pulley, means acting to hold the belt shifter in this position for a predetermined time, including a slide and a screw driven from said shaft, said slide, after a predetermined movement in one direction releasing the belt shifter, the slide when it reaches said releasing position also releasing the deflecting means to thereby permit the cotton to pass directly from the condenser to the press box, means then acting after a predetermined time to automatically shift the belt shifter in a direction to carry the belt onto the fast pulley, and thereby rotate the cotton discharge winding drum and winding the belt thereon, to thus discharge the cotton from the belt, said means comprising a mutilated gear wheel adapted to be driven from the main shaft of the condenser, said main shaft carrying a pinion initially disposed in the mutilation of the gear wheel, the gear wheel having a wrist pin, a connecting rod on the wrist pin having means operating upon a forward movement of the wrist pin to shift the belt shifter to a position to carry the belt onto the fixed pulley, said slide acting to hold the belt shifter in its last named shifted position until the cotton has been discharged from the belt and then release the belt shifter to permit its return to neutral position, said slide being operatively engaged with the gear wheel to cause an initial movement of the gear wheel upon the end of said last named movement of the slide to thus operatively connect the gear wheel with the pinion and cause a rotation of the gear wheel, and the eventual engagement of the belt shifting operating member with the belt shifter.

11. The combination with a cotton gin and a press box, means for retaining a certain amount of cotton initially issuing from the cotton gin and preventing the cotton from passing to the press box including two winding drums, a belt connected to both drums and adapted to be wound thereon, means for deflecting cotton issuing from the gin on to said belt and simultaneously rotating one of said drums to thereby wind the belt and cotton upon the drum, means causing the stoppage of one of said drums after a predetermined time and acting to shift said cotton deflecting means from its deflecting position to a position to permit the cotton to discharge directly from the gin into the press box, means whereby to cause the actuation of the other drum to wind the belt off from the first named drum on to the second named drum to thereby discharge the cotton thereon into the press box, and means for automatically stopping the operation of the second named drum after a predetermined time, said means for automatically stopping the operation including a screw operatively connected to the winding drums to rotate therewith, and a member having screw-threaded engagement with the screw travelling thereon.

12. The combination with a condenser having a discharge opening, and a swingable press box coacting therewith and within which the condenser discharges, and having a holding means, of means acting upon the release of the holding means preventing cotton discharged from the condenser from passing into the press box, said means then acting automatically to permit cotton to pass directly from the condenser to the press box, said means then acting automatically to discharge the retained cotton to the press box along with the cotton issuing from the condenser.

13. In a mechanism of the character described, a shaft, a neutral loose pulley on said shaft, a second loose pulley thereon, a second shaft to which the last named pulley is operatively connected, a pulley fast on said first named shaft, means operatively connecting the shafts to each other for simultaneous movement in reverse directions and permitting either shaft to act as a driving shaft and the other as a driven shaft, a driving belt normally engaging the neutral pulley, a belt shifter urged to a neutral position, manually operable means for moving the belt to shift the belt from the neutral pulley on to the second named pulley, a slide, a screw engaging the slide and driven from said first-named shaft, said slide after a predetermined movement in one direction releasing the belt shifter, means acting after a predetermined time to automatically shift the belt shifter in a direction to carry the belt onto the fast pulley, the screw then acting to reverse the movement of said slide, and the slide holding the belt shifter in its last named shifted position, the shifter being then released to return the belt to is neutral position.

In testimony whereof I hereunto affix my signature.

WILLIAM ERNEST CORBIN.